3,402,050
ALL PURPOSE-SHORTENING

Norman Bratton Howard and James Bruce Martin, Hamilton, Ohio, assignors to The Procter & Gamble Company, Cincinnati, Ohio, a corporation of Ohio
No Drawing. Filed June 11, 1965, Ser. No. 463,379
10 Claims. (Cl. 99—118)

This invention relates to an improved plastic shortening and, more particularly, to an improved all-purpose plastic shortening which is suitable for both frying and baking purposes.

A large number of shortenings are available on the market today for various cooking and other food purposes. Most of these shortenings are essentially glycerides of one sort or another; they are generally derived from animal, vegetable and marine fats and oils.

It is known that most natural fats and oils, particularly highly unsaturated and so-called polyunsaturated fats and oils, are subject to oxidative deterioration over normal commercial and household storage periods. This oxidative instability is accelerated during usage at high temperatures such as ordinary frying temperatures, particularly with repeated or continuous usage such as with deep fat frying.

One method of improving the oxidative stability of natural fats and oils consists of partial or complete hydrogenation of the unsaturated double bonds of the fatty acid constituents of the fats and oils. For certain purposes, however, it may be desirable to retain in the shortening a high proportion of unsaturated vegetable oils. For improving the oxidative stability of such unsaturated vegetable oils as well as some of the more highly saturated fats and oils, numerous antioxidant materials have been used with various degrees of effectiveness.

One of the most effective types of antioxidants for fats and oils is a silicone oil (organo polysiloxane) such as the methyl and ethyl silicones. The usefulness of these types of materials for antioxidant purposes in fats and oils is described in U.S. Patent 2,634,213, granted to James B. Martin, Apr. 7, 1953.

It has been observed that at concentrations greater than 0.5 part per million of silicone in the shortening, and particularly at levels of above one part per million, the silicone has undesirable effects upon the cake baking properties of the shortening, that is, the cakes tend to have a higher density (or less volume) and poorer texture than otherwise. Thus, the benefits of the antioxidant properties of higher levels of silicone in shortening for frying purposes is obtained only at the expense of the cake baking properties of the shortening. For example, the high smoke point frying oil described in U.S. Patent 2,988,319, granted to Vigen K. Babayan, Aug. 29, 1961, is adapted for use for deep fat frying of food, but is generally unsuitable for baking optimum quality cakes, particularly layer cakes.

Accordingly, it is an object of this invention to provide an all-purpose plastic shortening containing a high level of silicone which is suitable for both frying and baking purposes.

It is a further object of this invention to provide a plastic glyceride shortening composition which not only has a high smoke point (above about 375° F.) that makes it useful for frying but which also produces high volume and very good grain in cakes, particularly layer cakes, and is otherwise useful in general purpose baking.

These and other objects which will be apparent to those skilled in the art are achieved by adding to a plastic shortening from 0.5 to about 10 parts per million of a compound which improves the frying performance of the shortening selected from the group consisting of methyl and ethyl silicones and from about 0.25% to about 4%, by weight, of a material which counteracts the adverse effect of the silicone in layer cakes selected from the group consisting of (a) condensation products of dicarboxylic acid and fatty acid monoesters of straight chain aliphatic diol containing from 3 to 5 carbon atoms,
(b) condensation products of dicarboxylic acid and partial fatty acid glyceride containing an average of from 1 to 2 fatty acid radicals,
(c) acid anhydrides of said condensation products in (a) and (b), and
(d) mixtures thereof, said dicarboxylic acids having from 3 and 6 carbon atoms and said fatty acids having from about 12 to about 22 carbon atoms.

The silicone oils which are particularly useful in this invention are the methyl and ethyl silicones, including the straight and branched chain polymers more generally described in the above-mentioned Martin U.S. Patent 2,634,213. Suitable viscosities of these silicone oils for use in this invention are in the range of from about 50 to about 1,000,000, preferably from about 100 to about 1000 centistokes at 25° C. One particularly useful commercially-available silicone oil is the product marketed under the trademark "Dow Corning Antifoam A" which has a 500 centistokes viscosity.

The hereinbefore-described substances which are used in combination with the silicone oils to obtain the benefits of this invention are acidic lipid condensation products and their acid anhydrides. All of these substances are known to have desirable cake baking properties and it is known that some of them do not have a detrimental effect upon smoke points of shortenings. However, those skilled in the art have not heretofore discovered that the deep fat frying stabilization properties of high levels of silicone oils can be utilized in shortenings without a harmful effect upon the general baking characteristics of the shortening by also employing in the shortening these acidic lipid condensation products and/or their acid anhydrides.

The cake baking properties of the acidic lipid condensation products are described in U.S. Patents 3,145,107 to 3,145,109, inclusive, granted to Norman Bratton Howard, Aug. 18, 1964; the smoke point properties of some of these acidic lipid anhydrides are described in U.S. Patent 3,168,405, granted to James Bruce Martin and Norman Bratton Howard, Feb. 2, 1965.

In the above-mentioned Howard patents, four groups of acidic lipid condensation products are described as useful high temperature batter stabilizers when employed in combination with certain alpha-phase crystal-tending emulsifiers. In the present invention, it has been found that certain of these acidic lipid condensation products can be employed without need of the alpha-phase crystal-tending emulsifiers in shortenings which contain, in place of the alpha-phase crystal-tending emulsifiers, the above-mentioned silicone oils, which in combination impart useful baking and frying properties to the shortening. It has also been found that the acid anhydrides of these particular acidic lipid condensation products are useful for the same purpose when similarly employed in combination with the above-mentioned silicone oils.

Specific examples of the acidic lipid condensation products which can be used in the practice of this invention include: the condensation products of malonic, succinic, glutaric and adipic acids with (a) monoesters of propylene glycol, 1,3-propanediol, 1,4-butanediol, 1,3-butanediol, and 1,5-pentanediol containing fatty acid radicals having from about 12 to about 22 carbon atoms, and (b) monoglycerides, diglycerides, and mixtures of mono- and diglycerides containing fatty acid radicals having from about 12 to about 22 carbon atoms. The acid anhydrides of these acidic lipid condensation products and mixtures of the acidic lipid condensation products and their anhydrides can also be used in the practice of this invention.

The acidic lipid condensation products can be prepared by esterifying mono- and diglycerides, and/or monofatty acid esters of diols by direct esterification reactions, either catalyzed or uncatalyzed, such as those described in the above-mentioned Howard U.S. patents and by other conventional methods of esterification, in general, well known to those skilled in the art.

The acid anhydrides can be prepared by uncatalyzed metathesis of the corresponding acidic lipid condensation products with acetic anhydride such as described in the above-mentioned U.S. Patent 3,168,405 and by methods used for preparing long-chain fatty acid anhydrides, in general, well known to those skilled in the art.

The preferred acidic lipid condensation products in the shortening of this invention are derivatives of stearic and succinic acids such as stearoyl propylene glycol hydrogen succinate and distearin hydrogen succinate. Stearoyl propylene glyol succinate anhydride, distearin succinate anhydride and various mixtures of the above acidic lipid condensation products and their corresponding acid anhydrides are also desirable components in the shortening of this invention.

The physical structure of the glyceride shortening base which can be employed in the practice of this invention can be plastic, liquid, or a suspension of solids in liquid and can be of vegetable, animal, or marine origin. For example, among those materials which can be used are the ordinary triglyceride plastic shortenings which generally contain hydrogenated oils and fats; shortenings derived from liquid glyceride oils such, for example, as the naturally-occurring liquid cottonseed, soybean, peanut, rapeseed, crambe seed, sesame seed, sunflower seed and safflower oils as well as liquid fish oils such as herring and menhaden oils; shortenings containing triglycerides which have been subjected to various interesterification or rearrangement reactions, for example, such as interesterified or rearranged lard, coconut, palm, or cottonseed oils; and other mixtures of triglycerides having a variety of fatty acid radicals in their structures of from about 12 to about 22 carbon atoms.

The additives of this invention are thoroughly admixed by any conventional means for obtaining a homogeneous mixture with the glyceride shortening base, such as described herein, in proportions of from 0.5 to about 10 parts per million, by weight of the total composition, of silicone oil and from about 0.25% to about 4%, by weight of the total composition, of the acidic lipid condensation product and/or acidic lipid anhydride. The preferred concentration of additives is about 1 to about 2 parts per million of the silicone oil such as methyl silicone and about 1% of acidic lipid condensation product and/or anhydride such as, for example, stearoyl propylene glycol hydrogen succinate and/or stearoyl propylene glycol succinate anhydride.

The invention is further illustrated by the following examples. All percentages are by weight unless otherwise indicated.

EXAMPLE 1

High ratio white and yellow cakes were prepared according to the following recipes:

WHITE CAKE

| Ingredients | Instructions |
| --- | --- |
| 107 grams cake flour | Combine and mix 2 minutes at speed #5 (Sunbeam Mixer). |
| 133 grams sugar (granulated) | |
| 2.5 grams salt (sodium chloride) | |
| 47.5 grams shortening (described below) | |
| 90 grams whole milk | |

—Add—

| | |
| --- | --- |
| 6.7 grams Calumet baking powder (double-acting) | Mix 30 seconds at speed #1. |

—Add—

| | |
| --- | --- |
| 40 grams whole milk | Mix for 2 minutes at speed #5. |
| 60 grams fresh egg whites | |
| 2.5 cc. vanilla extract | |

Scale 8-inch pans with 400 grams batter. Bake for 25 minutes at 365° F.

YELLOW CAKE

| Ingredients | Instructions |
| --- | --- |
| 107 grams cake flour | Combine and mix for 2 minutes at speed #5 (Sunbeam mixer). |
| 133 grams sugar (granulated) | |
| 2.5 grams salt (sodium chloride) | |
| 47.5 grams shortening (described below) | |
| 90 grams whole milk | |

—Add—

| | |
| --- | --- |
| 6.7 grams Calumet baking powder (double-acting) | Mix 30 seconds at speed #1. |

—Add—

| | |
| --- | --- |
| 40 grams whole milk | Mix for 2 minutes at speed #5. |
| 48 grams of whole eggs | |
| 2.5 cc. vanilla extract | |

Scale 8-inch pans with 400 grams batter. Bake for 30 minutes at 365° F

The shortening used in the above cake recipes was a partially hydrogenated blend of vegetable oils having an iodine value of about 70–75. The blend consisted of about 85% soybean and about 15% cottonseed oil-derived material. The white and yellow cakes prepared in this example had volumes of 965 cc. and 1200 cc., respectively, per 400 grams of batter. The shortening had a desirable smoke point of 440° F. when tested according to A.O.C.S. Standard Method Cc9a–48.

When one part per million of methyl silicone (100 centistokes viscosity) was used in the shortening component of these cakes as an additional ingredient in order to improve the frying stability of the shortening, the cake volumes were reduced to 900 cc. and 1057 cc., respectively, per 400 grams of batter. These results show the undesirable loss of 65 cc. and 143 cc., respectively, in white and yellow cake volume by employing methyl silicone in the shortening component of the cake recipe.

Similar white and yellow cakes were prepared as above, with or without methyl silicone as shown below, except that a mixture of acidic lipid condensation product and acidic lipid anhydride was also employed in the shortening. The additional materials employed were distearin hydrogen succinate (DSHS), stearoyl propylene glycol hydrogen succinate (SPGHS), and distearin succinate anhydride (DSSA). The improved cake volumes obtained with these cakes along with the desirable smoke points of the shortenings are shown in the following table.

TABLE I

| Shortening Additives | | | | Smoke Point (° F.) | Cake Type | Cake Volume (cc./400 grams batter) |
| --- | --- | --- | --- | --- | --- | --- |
| DSHS (Percent by weight) | SPGHS (Percent by weight) | DSSA (Percent by weight) | Silicone (p.p.m. by Weight) | | | |
| 0.75 | 0.25 | 0.25 | a1 | 427 | White | 1,125 |
| 0.75 | 0.25 | 0.25 | a1 | 427 | Yellow | 1,320 |
| 0.75 | 0.25 | 1.00 | a1 | 425 | White | 1,175 |
| 0.75 | 0.25 | 1.00 | a1 | 425 | Yellow | 1,355 |
| 0.75 | 0.25 | 0.25 | b1 | 425 | White | 1,105 |
| 0.75 | 0.25 | 1.00 | b1 | 425 | do | 1,325 |
| 0.75 | 0.25 | 1.00 | 0 | (1) | do | 1,225 |

1 Not tested.   a 100 centistokes viscosity.   b 1000 centistokes viscosity.

EXAMPLE 2

High ratio yellow cakes were prepared according to Example 1 with either 10 parts per million of methyl silicone (100 centistokes viscosity) or none at all in the shortening component. The shortening component also contained acidic lipid condensation product or acidic lipid anhydride as shown in the following table. For comparison purposes, similar cakes were also baked in which octadecyl hydrogen succinate, another known cake improver was used instead of the acidic lipid condensation product or acidic lipid anhydride which is useful in this invention. The following table shows the hot and cold cake volumes, the cake profile grade, and the cellular grade (grain) of the cakes. The hot cake volumes were measured immediately after the 30 minutes cake baking period while the cold volumes were measured 15 minutes thereafter. The cake profile grade describes the difference in height of the cake layer between the center and the edge of the cake. The positive integers represent the number of units higher by which the height at the center of the cake varies from the height at the edge. Each unit equals two (2) millimeters. The cellular grade (or grain) of the cake is a subjective measurement of the coarseness or fineness of the cake texture. A grain value of from about 20 to about 25 represents a standard texture. Higher values represent finer grain whereas lower values represent coarser grain.

TABLE II

| Shortening Additive (Percent by weight) | Silicone (p.p.m. by weight) | Cake Volume Hot/Cold | Cake Structure Profile/ cellular grade/grade |
|---|---|---|---|
| Control cake | 0 | 1,355/1,235 | +5/26 |
| Do | 10 | <800/<800 | (1) |
| One (1) percent stearoyl propylene glycol hydrogen succinate | 0 | 1,425/1,320 | +7/25 |
| Do | 10 | 1,295/1,225 | +13/25 |
| One (1) percent distearin hydrogen succinate | 0 | 1,465/1,320 | +6/27 |
| Do | 10 | 1,245/1,180 | +12/25 |
| One (1) percent stearoyl propylene glycol succinate anhydride | 0 | 1,245/1,185 | +4/24 |
| Do | 10 | 970/935 | +1/28 |
| One (1) percent octadecyl hydrogen succinate | 0 | 1,385/1,260 | +3/24 |
| Do | 10 | <800/<800 | (1) |

[1] Complete failure.

The above table shows that the addition of 10 parts per million of methyl silicone to the shortening component of the control cake without the additives of this invention results in a cake failure. The addition to the shortening of one (1) percent of various additives which are useful in this invention, substantially overcomes the detrimental effect of the methyl silicone upon the cake baking properties of the shortening. Although the acidic lipid anhydride is not as effective as the acidic lipid condensation products in this example, the anhydride is substantially better than the control cake results without acidic lipid condensation product or acidic lipid anhydride.

EXAMPLE 3

High ratio white cakes were prepared according to Example 1 with the shortening base of that example, and with various levels of methyl silicone (100 centistokes viscosity) and the other additives described in Example 2 in the shortening component. The following table shows the results obtained for these cakes.

TABLE III

| Shortening Additive (Percent by weight) | Silicone (p.p.m. by weight) | Cake Volume Hot/Cold | Cake Structure Profile/ cellular grade/grade |
|---|---|---|---|
| Control cake | 0 | 1,065/985 | +7/25 |
| Do | 1 | 1,025/980 | +3/23 |
| Do | 10 | 800/800 | (1) |
| One (1) percent stearoyl propylene glycol hydrogen succinate | 0 | 1,435/1,300 | +8/30 |
| Do | 0.6 | 1,300/1,215 | +10/25 |
| Do | 1.0 | 1,145/1,090 | +6/24 |
| Do | 10.0 | 1,020/975 | +6/26 |
| One (1) percent distearin hydrogen succinate | 0 | 1,405/1,240 | +9/30 |
| Do | 1.0 | 1,330/1,225 | +10/26 |
| Do | 10.0 | 1,025/945 | +6/25 |
| One (1) percent stearoyl propylene glycol succinate anhydride | 0 | 1,170/1,030 | +5/26 |
| Do | 0.6 | 1,115/1,060 | +3/22 |
| Do | 1.0 | 1,130/1,030 | +5/24 |
| One (1) percent octadecyl hydrogen succinate | 0 | 1,125/1,060 | +5/25 |
| Do | 1.0 | 1,095/1,020 | +6/22 |
| Do | 10.00 | 800/800 | (1) |

[1] Complete failure.

The above results with white cakes are fairly comparable to the results with yellow cakes of Example 2 with respect to the substantial improvements obtained in cake volume, profile, and cellular characteristics with the acidic lipid condensation products and acidic lipid anhydrides of this invention in the presence of methyl silicone compared to similar cakes with comparable levels of methyl silicone but without the additives which are useful in this invention.

When ethyl silicone is substituted for the methyl silicone in Examples 1 to 3, above, frying and baking results substantially similar to the results of Examples 1 to 3 are obtained.

Variations and modifications of the present invention can be made upon study of the foregoing disclosure by those skilled in the art. Such variations and modifications are intended to be within the spirit and scope of the invention as defined in the appended claims.

What is claimed is:

1. An all-purpose plastic shortening composition for frying and baking having a smoke point greater than about 375° F. and capable of producing cakes of high volume and fine texture comprising fatty glyceride having admixed therein from 0.5 to about 10 parts per million of methyl silicone having a viscosity of from about 50 to 1,000,000 centistokes and from about 0.25% to about 4%, by weight, of material selected from the group consisting of
  (a) condensation products of dicarboxylic acid and fatty acid monoester of straight chain aliphatic diol containing from 3 to 5 carbon atoms,
  (b) condensation products of dicarboxylic acid and partial fatty acid glyceride containing an average of from 1 to 2 fatty acid radicals,
  (c) acid anhydrides of said condensation products in (a) and (b), and
  (d) mixtures thereof,
said dicarboxylic acids having from 3 to 6 carbon atoms and said fatty acid radicals having from about 12 to about 22 carbon atoms.

2. The shortening of claim 1 in which the methyl silicone has a viscosity of from about 100 to about 1000 centistokes.

3. The shortening of claim 1 in which the fatty acid radicals of the condensation products and acid anhydrides have about 18 carbon atoms.

4. The shortening of claim 1 in which the dicarboxylic acid is succinic acid.

5. The shortening of claim 1 in which the fatty acid radicals of the condensation products and acid anhydrides have about 18 carbon atoms and in which the dicarboxylic acid is succinic acid.

6. The shortening of claim 1 in which the fatty glyceride is derived from a mixture of soybean and cottonseed oils hardened to an iodine value of from about 70 to about 75.

7. The shortening of claim 1 in which the level of methyl silicone is from about 1 to about 2 parts per million.

8. An all-purpose plastic shortening for frying and baking having a smoke point greater than about 375° F. and capable of producing cakes of high volume and fine texture comprising fatty glyceride having admixed therein from 0.5 to about 10 parts per million of methyl silicone having a viscosity of from about 50 to 1,000,000 centistokes and from about 0.25% to about 4%, by weight, of a mixture of stearoyl propylene glycol hydrogen succinate, distearin hydrogen succinate and distearin succinate anhydride.

9. An all-purpose plastic shortening for frying and baking having a smoke point greater than about 375° F. and capable of producing cakes of high volume and fine texture, comprising fatty glyceride having admixed therein from about 1 to about 2 parts per million of methyl silicone having a viscosity of from about 50 to 1,000,000 centistokes and about 1%, by weight, of stearoyl propylene glycol hydrogen succinate.

10. An all-purpose plastic shortening composition for frying and baking having a smoke point greater than about 375° F. and capable of producing cakes of high volume and fine texture comprising fatty glyceride having admixed therein from 0.5 to about 10 parts per million of a material selected from the group consisting of methyl silicone and ethyl silicone having a viscosity of from about 50 to 1,000,000 centistokes and from about 0.25% to about 4%, by weight, of material selected from the group consisting of
  (a) condensation products of dicarboxylic acid and fatty acid monoester of straight chain aliphatic diol containing from 3 to 5 carbon atoms,
  (b) condensation products of dicarboxylic acid and partial fatty acid glyceride containing an average of from 1 to 2 fatty acid radicals,
  (c) acid anhydrides of said condensation products in (a) and (b), and
  (d) mixtures thereof,
said dicarboxylic acids having from 3 to 6 carbon atoms and said fatty acid radicals having from about 12 to about 22 carbon atoms.

References Cited
UNITED STATES PATENTS 3,029,147   4/1962   Radlove _____ 99—118
3,145,110   8/1964   Abbott _____ 99—118 X MAURICE W. GREENSTEIN, *Primary Examiner.*